US011565353B2

(12) United States Patent
Johnson et al.

(10) Patent No.: US 11,565,353 B2
(45) Date of Patent: Jan. 31, 2023

(54) AXLE WELDER

(71) Applicants: Stephen A. Johnson, South Bend, IN (US); Dean Sevenevy, South Bend, IN (US); Wendell J. Klota, South Bend, IN (US)

(72) Inventors: Stephen A. Johnson, South Bend, IN (US); Dean Sevenevy, South Bend, IN (US); Wendell J. Klota, South Bend, IN (US)

(*) Notice: Subject to any disclaimer, the term of this patent is extended or adjusted under 35 U.S.C. 154(b) by 393 days.

(21) Appl. No.: 16/777,972

(22) Filed: Jan. 31, 2020

(65) Prior Publication Data

US 2021/0237210 A1 Aug. 5, 2021

(51) Int. Cl.
*B23K 37/00* (2006.01)
*B23K 37/02* (2006.01)
*B23K 37/053* (2006.01)
*B23K 101/04* (2006.01)

(52) U.S. Cl.
CPC ...... *B23K 37/0282* (2013.01); *B23K 37/0211* (2013.01); *B23K 37/0247* (2013.01); *B23K 37/0538* (2013.01); *B23K 2101/04* (2018.08)

(58) Field of Classification Search
CPC ............ B23K 37/0282; B23K 37/0211; B23K 37/0247; B23K 37/0538; B23K 2101/04; B23K 2101/006; B23K 37/0536; B23K 9/173; B23K 9/028–0288
USPC .......... 228/44.5, 48, 49.2, 49.3; 219/59.1–67
See application file for complete search history.

(56) References Cited

U.S. PATENT DOCUMENTS

| 1,954,679 | A | * | 4/1934 | Mirfield | B23K 11/062 |
| | | | | | 219/61.1 |
| 2,738,082 | A | * | 3/1956 | Vernon | B23K 37/0538 |
| | | | | | 414/433 |
| 2,964,610 | A | * | 12/1960 | Mackey | B23K 13/046 |
| | | | | | 219/84 |
| 3,159,129 | A | * | 12/1964 | Mauritz | B23K 31/022 |
| | | | | | 228/49.2 |
| 3,564,189 | A | * | 2/1971 | Rhodes | B23K 11/061 |
| | | | | | 219/67 |
| 3,634,648 | A | * | 1/1972 | Morris | B23K 9/0282 |
| | | | | | 219/60 A |
| 3,895,789 | A | * | 7/1975 | Mengeringhausen | |
| | | | | | B23K 37/0538 |
| | | | | | 279/2.12 |

(Continued)

*Primary Examiner* — Kiley S Stoner
(74) *Attorney, Agent, or Firm* — Crump Law P.C.

(57) ABSTRACT

The axle welder can be easily configured and adjusted to accommodate axle assemblies of varying axle shaft lengths, hub styles ("straight" and "drop axle") and lug bolt configurations. The axle welder uses a sliding carriage that slides along the support frame at one end of the welder to accommodate differing shaft lengths. The axle welder also includes a pair of pivoting hub lifts that accommodate both straight and drop axle style axle hubs using modular mounting plates. Modular mounting plates ("hub adaptors") fitted to the hub lifts accommodate hub assemblies with differing lug bolt patterns. The axle welder is built on a rectangular frame that supports a pair of weld units and articulated electrode arms. The axle welder also includes a pair axle supports for carrying the axle shafts within the support frame. A shaft drive pivotally mounted to the support frame lowers to engage and rotate the axle shaft and hub assemblies in unison during the welding process.

22 Claims, 11 Drawing Sheets

(56) References Cited

U.S. PATENT DOCUMENTS

| | | | | |
|---|---|---|---|---|
| 4,177,371 | A * | 12/1979 | Honig | B23K 9/028 |
| | | | | 219/60 R |
| 4,373,125 | A * | 2/1983 | Kazlauskas | B23K 9/0286 |
| | | | | 219/60 R |
| 4,504,047 | A * | 3/1985 | Jantzen | B23K 9/0284 |
| | | | | 269/287 |
| 4,779,856 | A * | 10/1988 | Beeler | B29C 66/522 |
| | | | | 269/45 |
| 5,075,527 | A * | 12/1991 | Ikuma | B23K 37/053 |
| | | | | 219/60 R |
| 5,536,915 | A * | 7/1996 | Peru | B23K 26/244 |
| | | | | 228/49.4 |
| 6,398,101 | B1 * | 6/2002 | Pollock | B23K 37/0452 |
| | | | | 228/49.1 |
| 6,899,263 | B2 * | 5/2005 | Tappan | B23K 9/048 |
| | | | | 228/49.1 |
| 7,784,666 | B2 * | 8/2010 | Iimura | B23K 37/0408 |
| | | | | 228/49.1 |
| 2005/0199600 | A1 * | 9/2005 | Ruthven | B23K 9/1735 |
| | | | | 219/125.1 |
| 2009/0084828 | A1 * | 4/2009 | Sohl | B23K 37/0408 |
| | | | | 228/5.7 |
| 2012/0324688 | A1 * | 12/2012 | Nohmi | B23K 37/0452 |
| | | | | 29/237 |
| 2016/0199949 | A1 * | 7/2016 | Narducci | B23K 37/0538 |
| | | | | 269/55 |
| 2017/0028517 | A1 * | 2/2017 | Ferrari | B23K 37/0538 |
| 2020/0078885 | A1 * | 3/2020 | Ferrari | B23K 37/0538 |
| 2021/0237508 | A1 * | 8/2021 | Martin | B23K 20/12 |

* cited by examiner

AXLE WELDER

This invention relates to an automated axle assembly welder for joining hub assemblies to an axle shaft.

BACKGROUND AND SUMMARY OF THE INVENTION

Axle assemblies of the type used in trailers include hub assemblies welded to axle shafts. To accommodate differing trailer designs and applications, axle assemblies are manufactured to various axle lengths. In addition, axle assemblies may use "straight" or "drop axle" hub assemblies with various hub sizes and lug bolt configurations.

Conventional manufacturing methods for axle assemblies are labor and time intensive. Axle assemblies are typically manually welded axle shafts between wheel hub assemblies. The welding process requires specific fixtures to hold the hubs and shafts in proper alignment during the welding process. The fixtures vary with every different hub assembly and shaft length.

The axle welder of this invention automates the process of joining hub assemblies to axle shafts and can be easily configured and adjusted to accommodate axle assemblies of varying axle shaft lengths, hub styles ("straight" and "drop axle") and lug bolt configurations. The axle welder uses a sliding carriage that slides along the support frame at one end of the welder to accommodate differing shaft lengths. The axle welder also includes a pair of pivoting hub lifts that accommodate both straight and drop axle style axle hubs using modular mounting plates. Modular mounting plates ("hub adaptors") fitted to the hub lifts accommodate hub assemblies with differing lug bolt patterns. The axle welder is built on a rectangular frame that supports a pair of weld units and articulated electrode arms. The axle welder also includes a pair of axle supports for carrying the axel shafts within the support frame. A shaft drive pivotally mounted to the support frame lowers to engage and rotate the axle shaft and hub assemblies in unison during the welding process.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
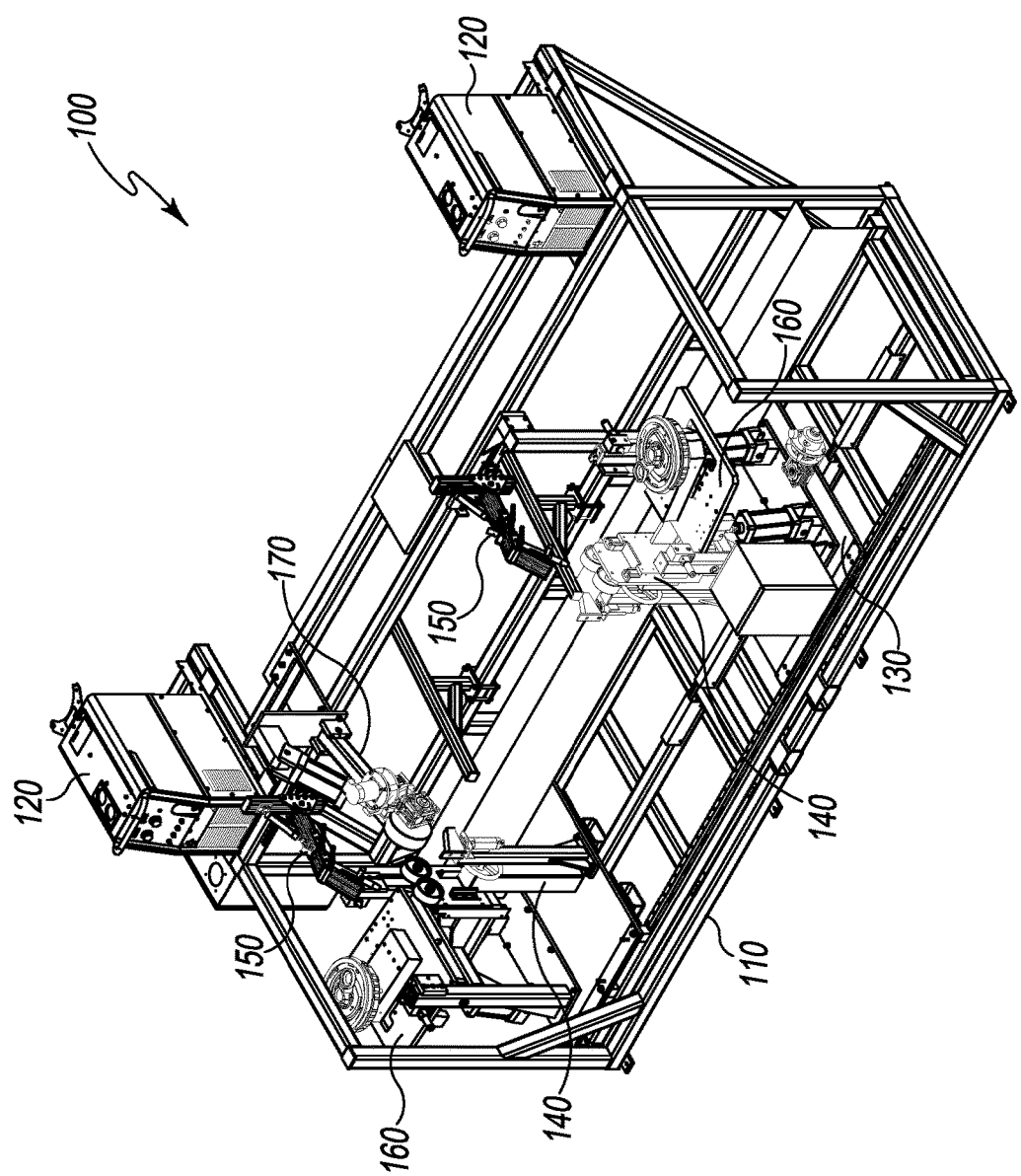
FIG. 1 is a front perspective view of an exemplary embodiment of the axle welder of this invention.
Figure 2:
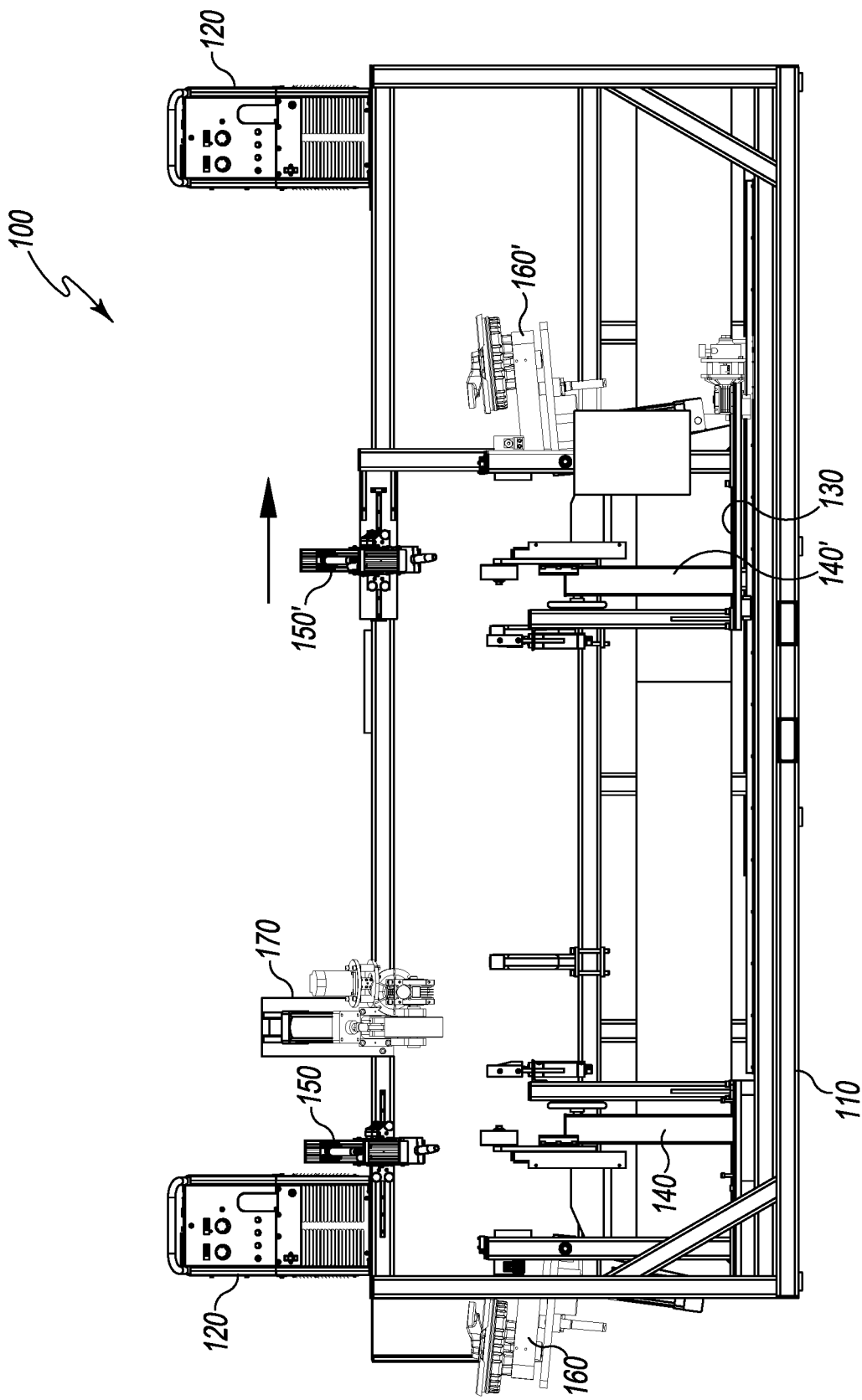
FIG. 2 is a front elevation view of the axle welder of FIG. 1 shown with the carriage positioned toward the middle of the welder.
Figure 3:
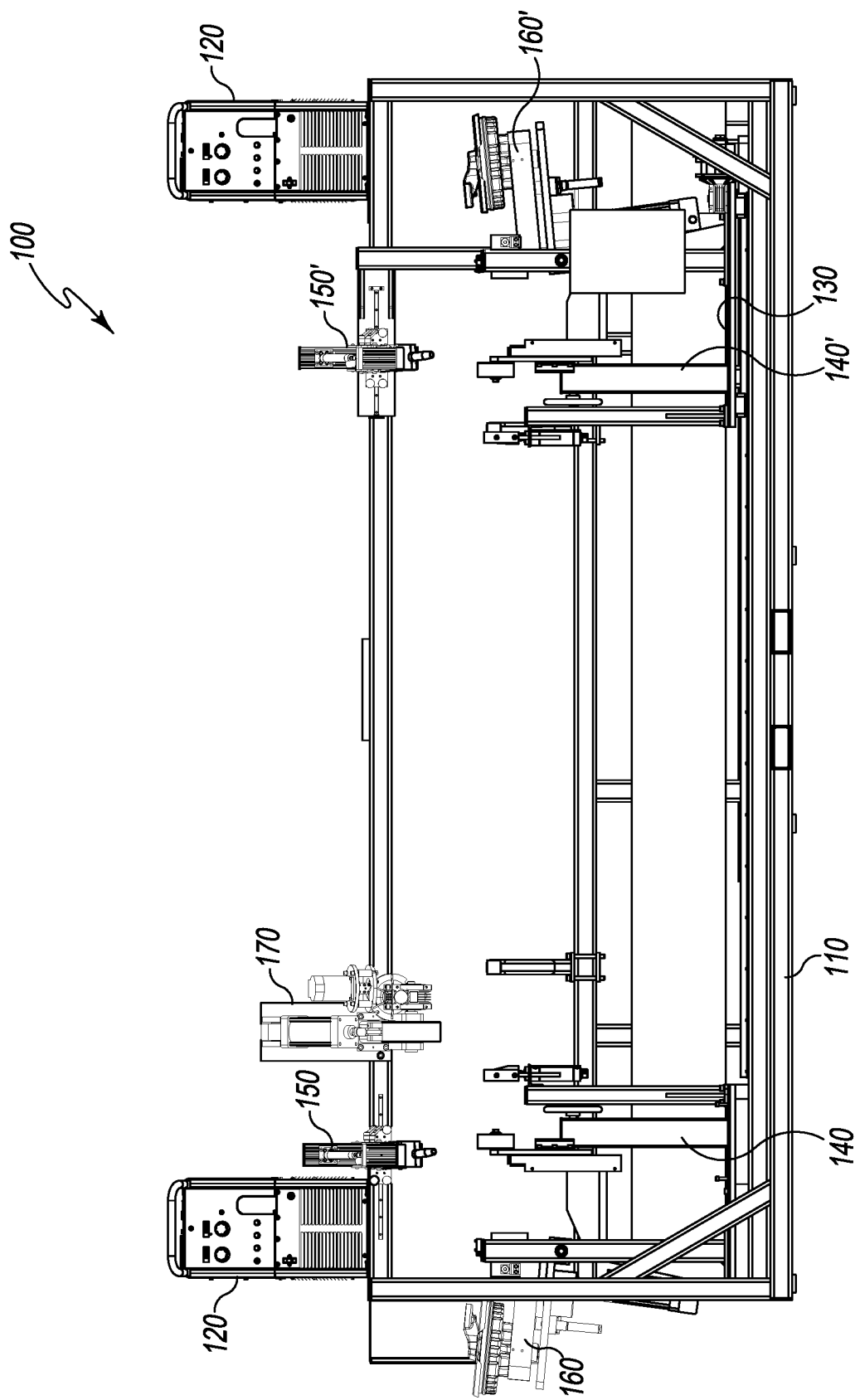
FIG. 3 is a front elevation view of the axle welder of FIG. 1 shown with the carriage positioned toward the adjustable end of the welder.
Figure 4:
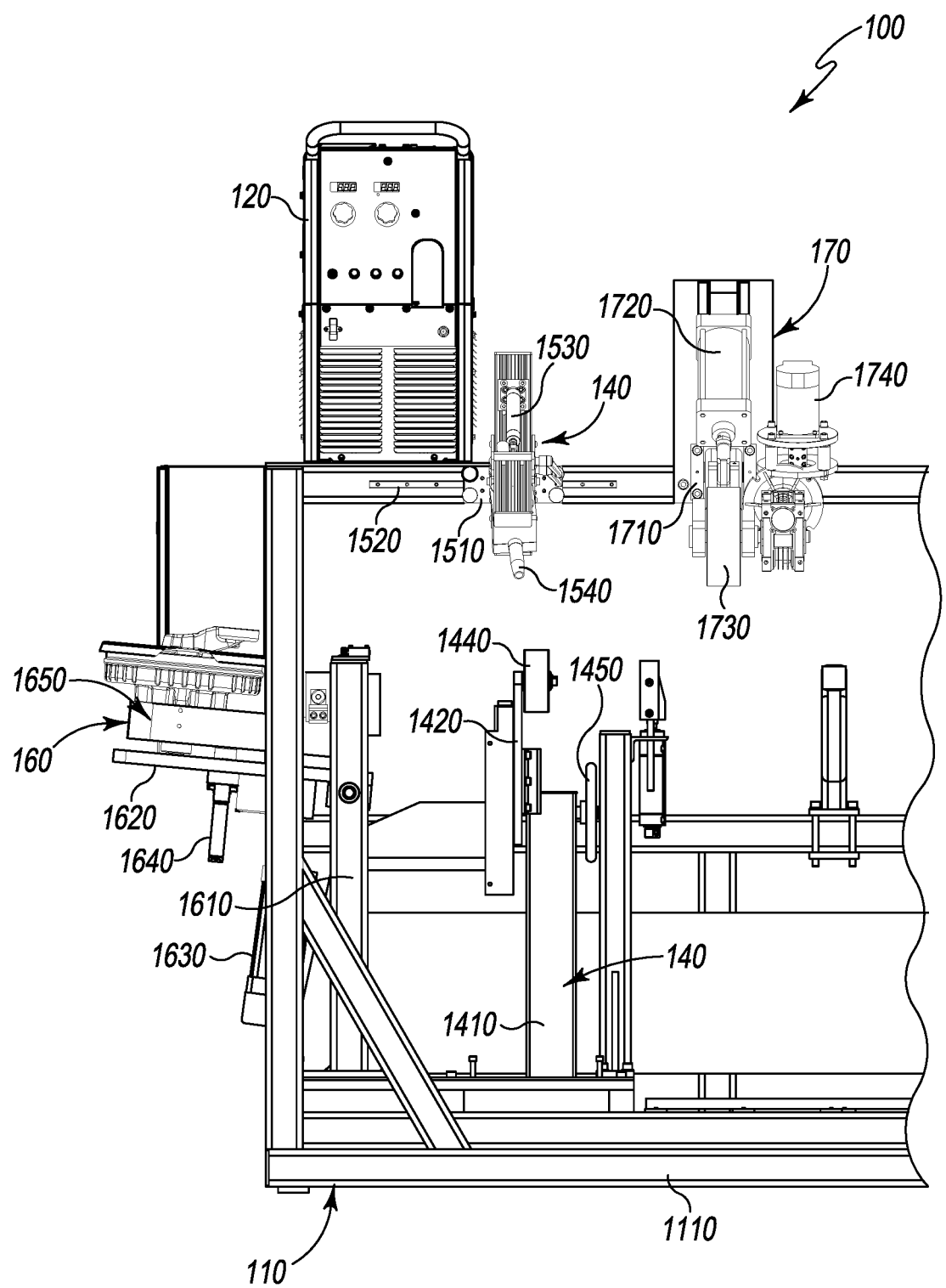
FIG. 4 is a partial front elevation view of the axle welder of FIG. 1 showing the "fixed" end of the welder with the hub lifts in the load position.
Figure 5:
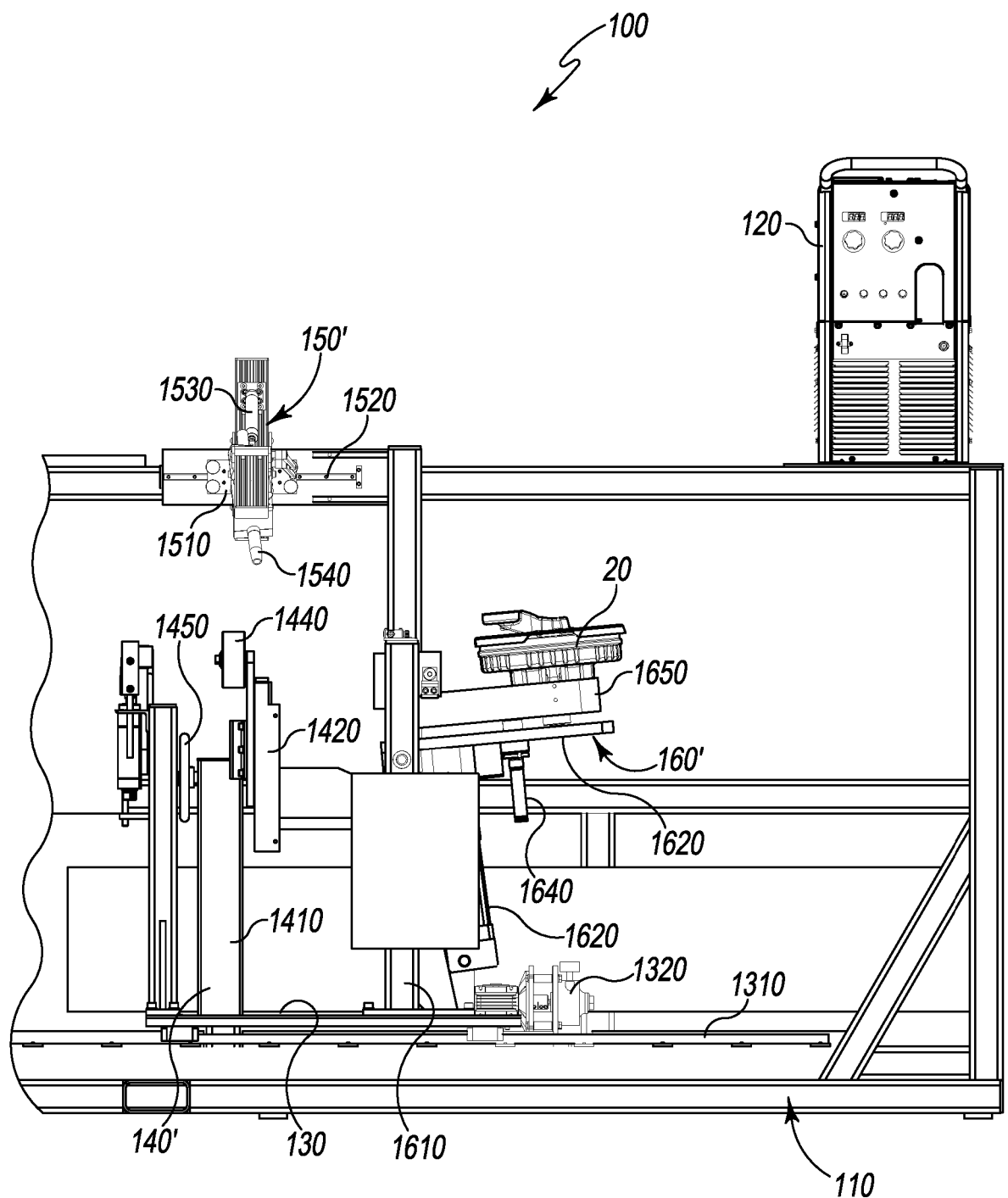
FIG. 5 is a partial front elevation view of the axle welder of FIG. 1 showing the "adjustable" end of the welder with the hub lifts in the load position.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-11 illustrate an exemplary embodiment of the axle welder of this invention, which is designated generally as reference numeral 100. Axle welder 100 is designed to simultaneously weld a pair of hub assemblies to an axle shaft. Axle Welder 100 can be easily adjusted to accommodate axle assemblies of varying shaft lengths. Axle welder 100 employs a pivoting hub lift sub-assembly that accommodates both straight and drop axle style axle hubs using modular mounting plates. In addition, the modular mounting plates accommodate hub assemblies with differing lug bolt patterns.

Axle welder 100 includes the following main components and sub-assemblies: a support frame 110; a pair of elevated weld units 120, a slide carriage 130, a pair of axle supports 140, a pair of articulated electrode arms 150; a pair of hub lifts 160; and a shaft drive 190. Axle welder 100 also includes a conventional electronic automated control system (not shown) that controls the various operations of the welder. Such control systems are common and well known in automated assembly processes. Controller systems includes a controller (now shown) that is electrically wired to the various motors, actuators, sensors and switches employed by the various components and sub-assemblies of Welder 100. The controller is wired to any available power source and provides the operation and control logic for welder 100. The control system also includes various switches, sensors and relays.

Axle welder 100 is configured so that axle shafts are loaded longitudinally into the frame interior from the back side of the welder and axle hubs are loaded laterally into the frame interior from the sides of the welder. Once the weld process is completed the finished axle assemblies are conveyed from the frame interior through the front side of welder 100. Axle welder 100 is built on box-shaped support frame 110, which is generally constructed of welded metal plate and tubing. Support frame 110 includes various beams, uprights, cross members and braces that hold and support the various sub assemblies and components of welder 100. In particular, support frame 110 includes a frame base 1110, end upright 1120 and raised longitudinal beams 1130.

Weld units 120 mount atop support frame 110 at opposed ends of the welder. Weld units 120 are mounted raised beams 1140 of support frame 110. Weld units 120 are of conventional design and operation of the type commonly known and used in the joining of axle assemblies. Weld units 120 are typically electrical flux-cored arc welding (FCA) type welding units, such as the units manufactured and sold by * of city, state. FCA weld units use a continuously-fed consumable tubular electrode containing a flux and provide high welding speed and portability.

Slide carriage 130 is mounted to support frame 110 for longitudinal movement at one end (the "slide end") of support frame 110. Slide carriage 130 rides on rails 1310 mounted to frame base 1120 of support frame 110. Linear actuators 1320 move slide carriage 130 to selectively position the carriage along the length of the rails 1310. The movement of sliding carriage 130 allows the distance between the sub-assembly to be selectively adjusted to easily accommodate axle shafts of varying lengths.

Shaft support assemblies 140 and 140' are used to position the axle shaft within the frame interior relative to the hub lift assemblies 160. One shaft support (the "fixed" support 140) is mounted to base of support frame 110. The opposite shaft support (the "adjustable" support 140') is mounted to slide carriage 130. Each shaft supports 140 and 140' includes a post 1410 and extensible mast 1420 that support a head plate 1430 and a pair of rollers 1440. Axle shaft 10 rests longitudinally between rollers 1440. A mast wheel 1450 is turned to raise and lower mast 1420 from post 1410. In alternative embodiments, mast 1420 may be extended using linear actuators mounted to or within post 1410 and controlled by the welder's electronic control system.

Articulated electrode arms 150 and 150' are mounted to support frame 110 and slide carriage 130, respectively. Each electrode arm 150 and 150' is pivotally mounted to an arm carriage 1510 that rides on slide rails 1520. Electrode arm 150 rides on slide rails 1520 that is mounted to a raised frame beam 1130. Electrode arm 150' rides on slide rails 1520 that is mounted to an elevated carriage beam 1340 that extends over carriage 130. Hydraulic arm actuator 1530 moves electrode arms 150 and 150' between a raised position spaced away from the hub lift assemblies and a lowered position selectively located to form the weld joint and join the wheel hub 20 and axle shaft 10. Arms actuators 1530 are operatively connected to the welder's control system. Each electrode arm 150 and 150' terminate in an electrode head 1540, which is fully adjustable about multiple axis for selectively positioning the electrode head relative to hub assemblies 20. The weld cable (not shown) provides the electrical current from weld unit 120 to electrode heads 1540.

Figure 8:
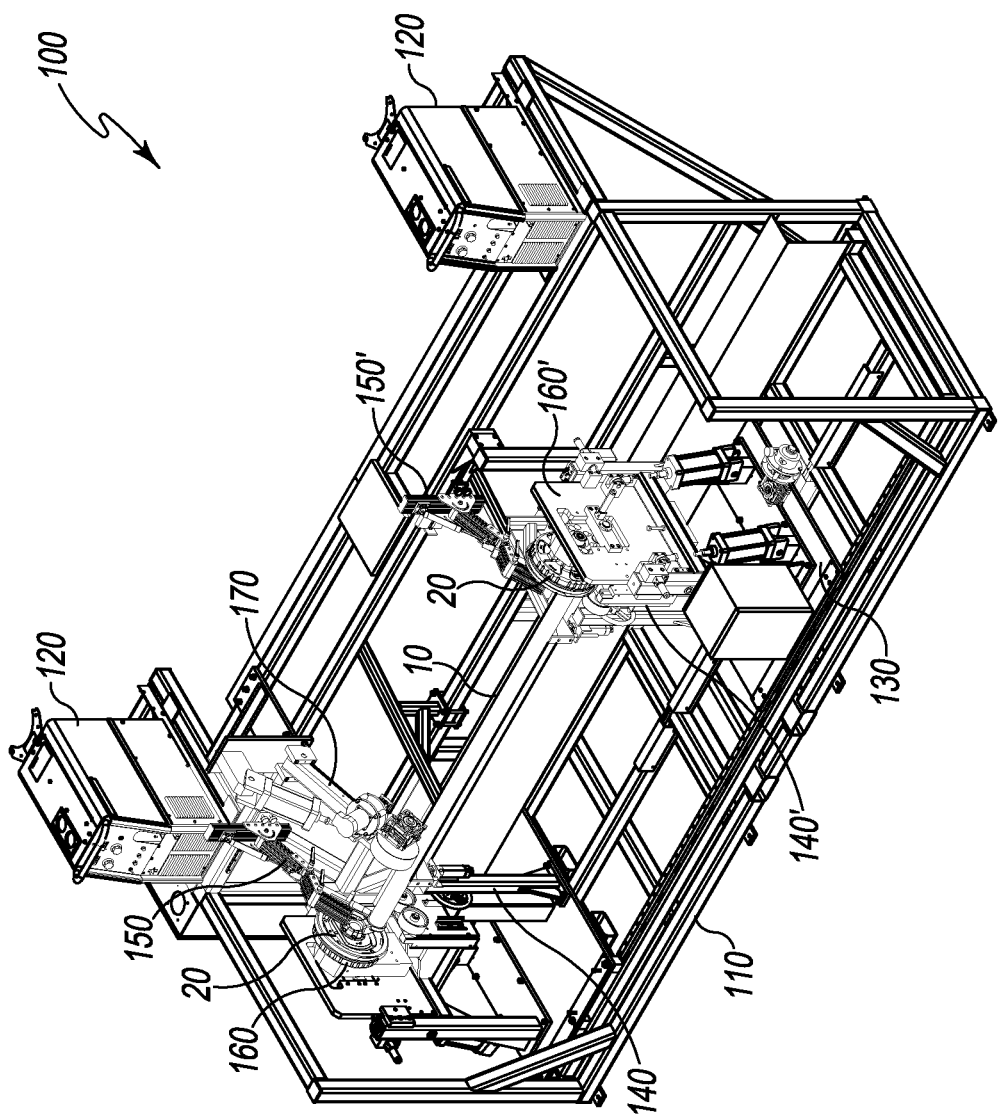
FIG. 8 is a front elevation view of the axle welder of FIG. 1 shown joining hub assemblies to an axle shaft.
Figure 9:
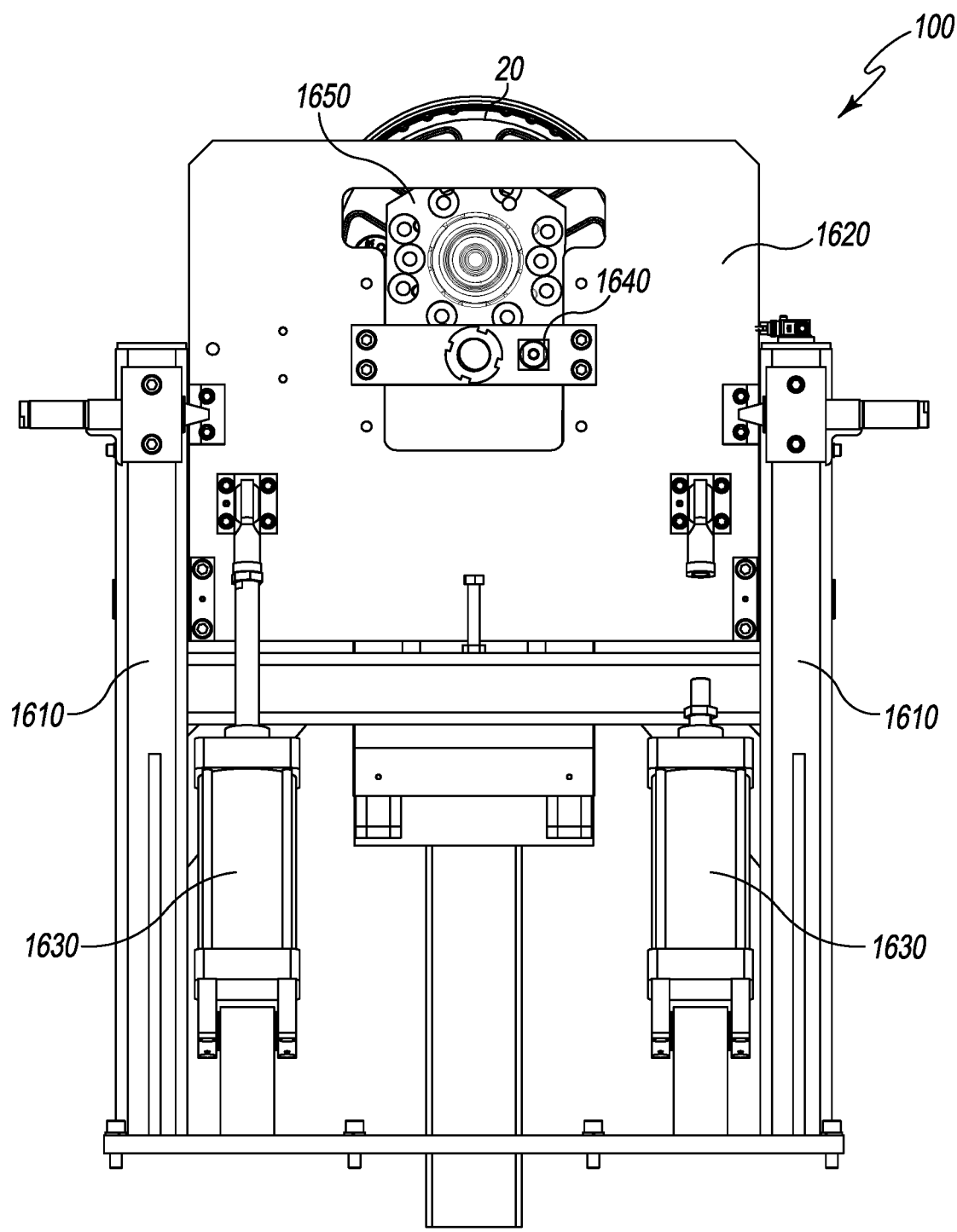
FIG. 9 is an end view of the "fixed" hub lift of the axle welder of FIG. 1.
Figure 10:
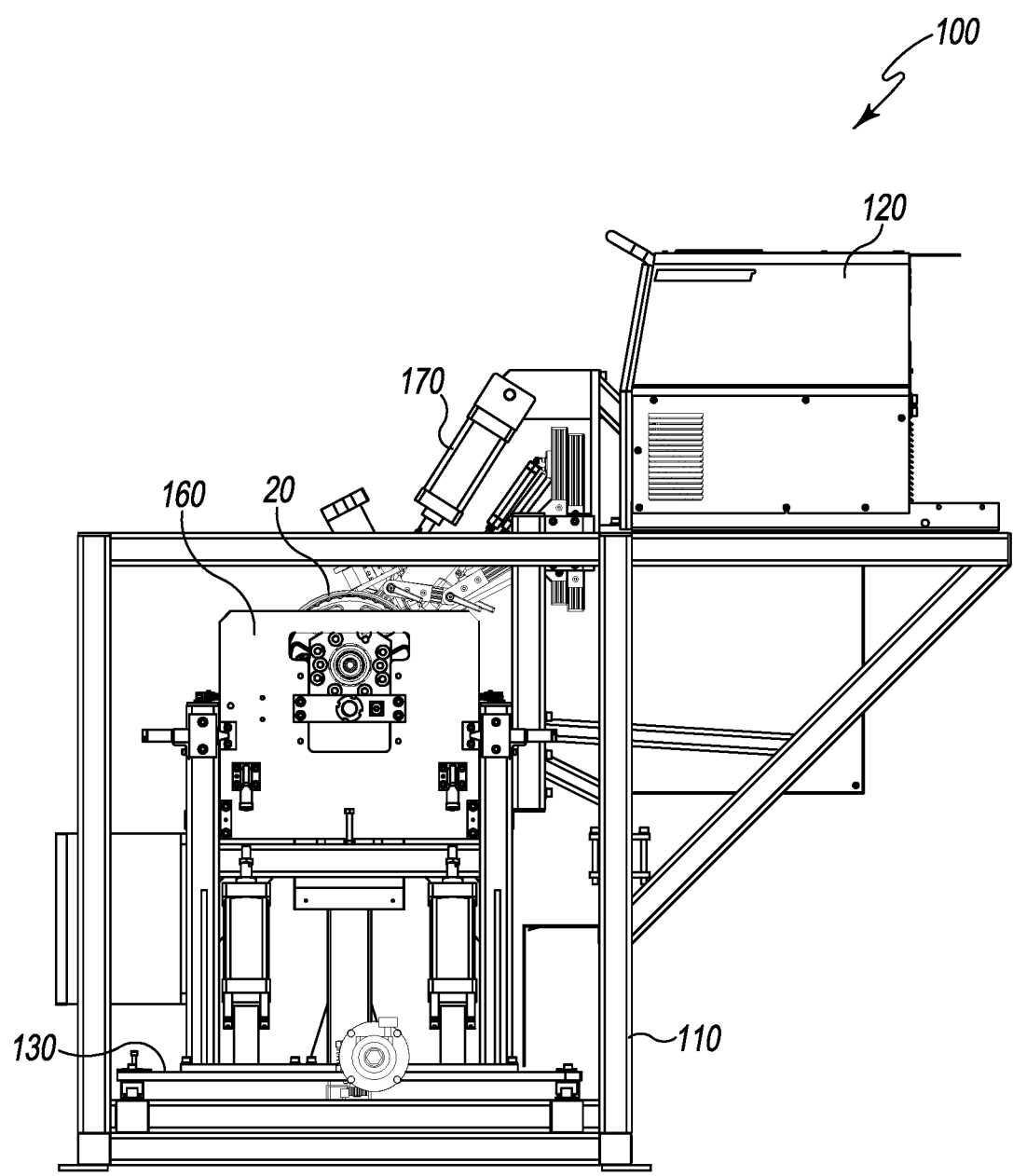
FIG. 10 is an end view of the "adjustable" end of the axle welder of FIG. 1.
Figure 11:
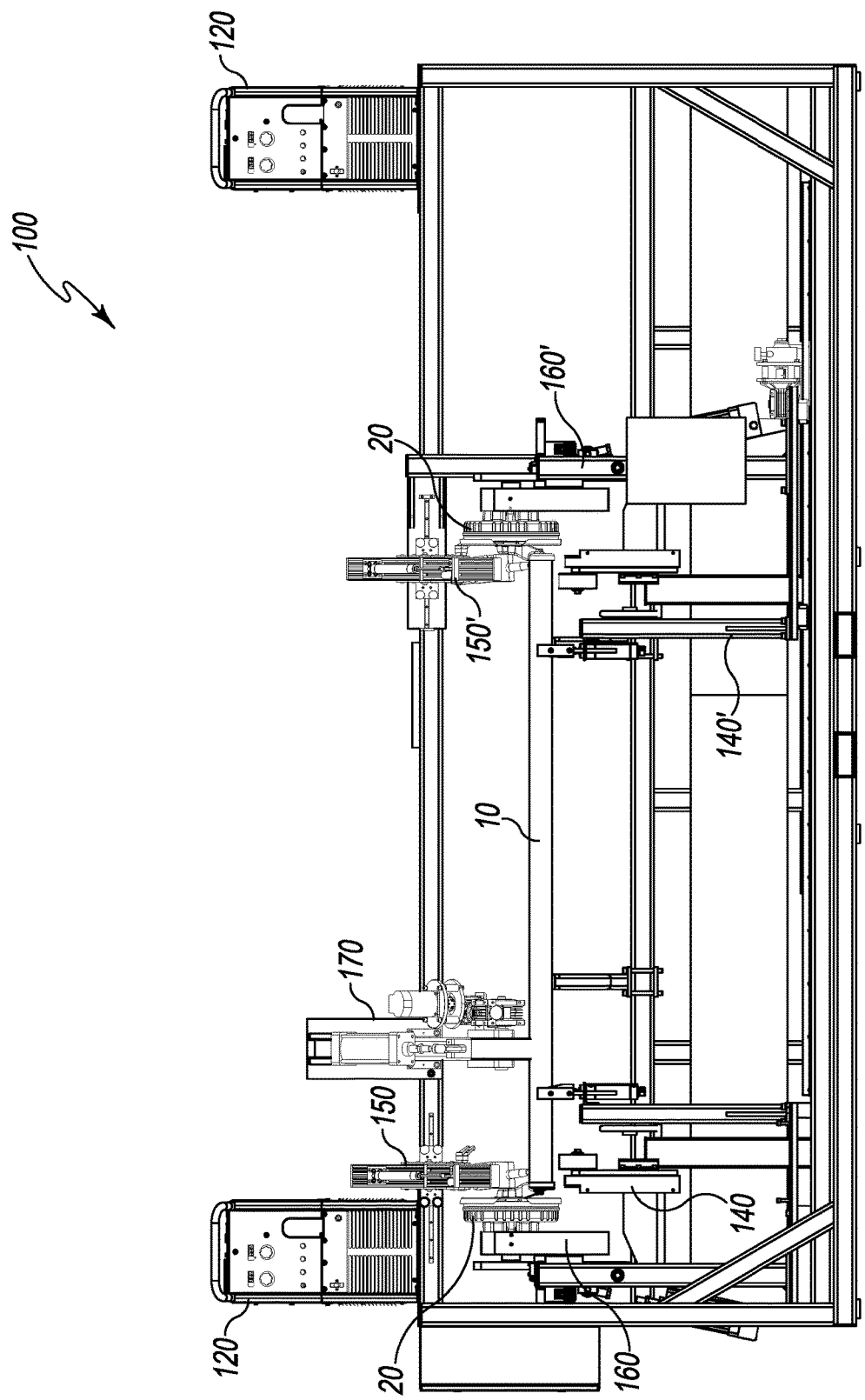
FIG. 11 is a front elevation view of the axle welder of FIG. 1 shown joining hub assemblies to an axle shaft.

Hub lifts 160 and 160' are used to load and move axle hubs 20 into a position relative to axles 10 for welding within axle welder 100. Again, one hub lift (the "fixed" lift 160) is mounted to support frame 110 and the other hub lift (the "carriage lift 160') is mounted to slide carriage 130. Each hub lift 160 and 160' includes an upright 1610 extending from the base of support frame 110 and slide carriage 130, respectively. Each hub lift 160 and 160' also includes a hub platen 1620 pivotally connected to uprights 1610 and a hydraulic cylinder platen actuator 1630 that moves the hub platen 1620 between a load position (FIGS. 1-5) and a weld position (FIGS. 8 and 11). A lock solenoid 1640 is mounted to hub platen 1620 and has an extensible pin (not shown) that extends through a through hole in the platen. Lock solenoid 1640 is used to lock hub assembly 20 in a desired "pre-weld" orientation within hub lifts 160 and 160'.

Figure 6:
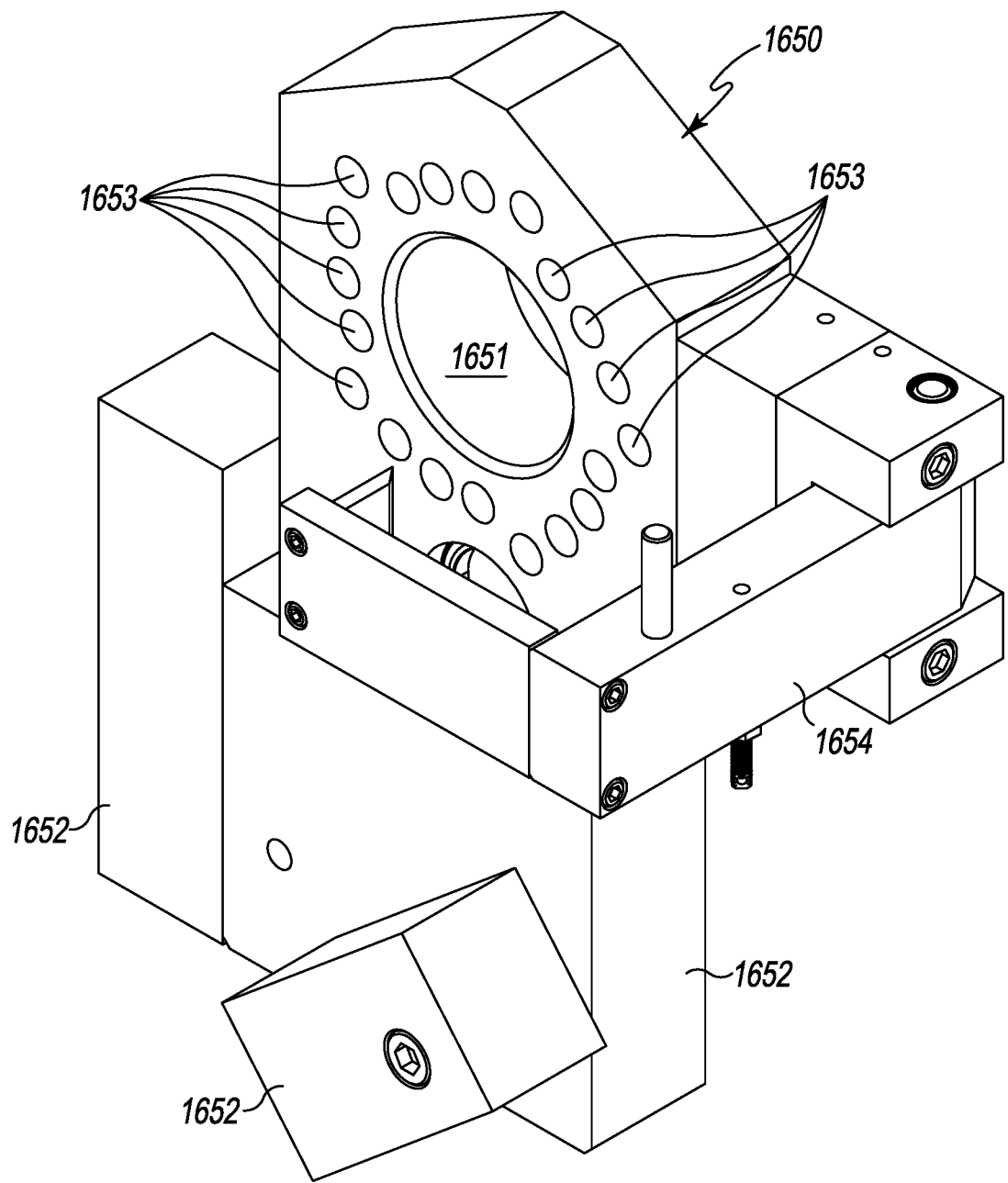
FIG. 6 is a perspective view of an exemplary embodiment of the hub adaptor of this invention.
Figure 7:
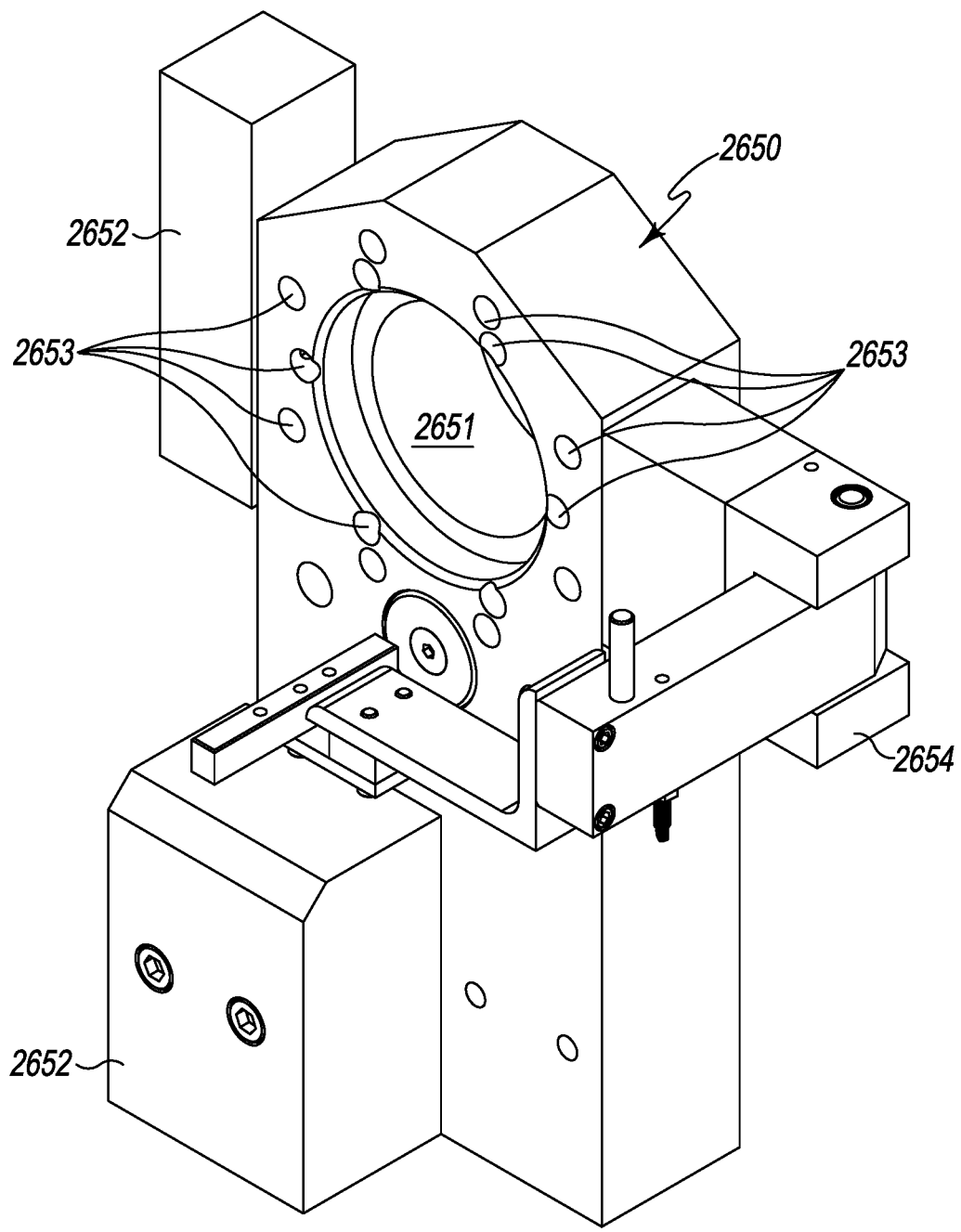
FIG. 7 is a perspective view of a second exemplary embodiment of the hub adaptor of this invention.

Each hub platen 1620 rotatably carries modular hub adaptors 1650 and 2650 specifically configured for use with differing styles of hub assemblies, particularly "straight" or "drop axle" hubs, FIGS. 6 and 7 respectively. Hub adaptors 1650 and 2650 are rotatably mounted on a bearing shaft (not shown) extending from hub platen 1620, which allows the adaptors to rotate relative to the plane of the platen. Each hub adaptor 1650 and 2650 is mounted to the bearing shafts of hub platen 1640 so that the hub adaptor axis of rotation is co-aligned with the hub assemblies 20 axis of rotation. As shown, each hub adaptor 1650 and 2650 is configured to allow a hub assembly to be fitted thereto using the hub's own lug bolts and nuts. Each hub adaptor 1650 and 2650 has a number of lug bores 1651 that extends through the flat adaptor. Lug bores 1651 are located and sized to accept four, five and six bolt patterns for use with a wide variety of axle hubs without changing hub adaptors 1650. Hub adaptors 1650 and 2650 also have a lock bore 1653 that receives the extensible solenoid pin of lock solenoid 1640.

Each hub adaptor 1650 and 2650 includes detachable counter weights 1552 that bolt onto the adaptor at various locations to selectively balance hub lifts 160 and 160' and hub assemblies 20 during the welding process. Hub adaptors 1650 also include a pivot locator arm 1654 which swings between a loading position swung away from hub 10 and an index position in contact at select position on the hub assembly 20. Locator arms 1654 carry contact sensors that ensure hub 10 is properly positioned and oriented with respect to electrode heads 1540 when the weld process is initiated.

Welder 100 also includes a shaft drive sub-assembly 170 mounted to raised beam of support frame 110. Shaft drive 170 engages axle shaft 10 during the weld process to rotate the shaft and hubs 20 in unison as electrode head 1540 forms the weld bead joining the hubs and shaft. Shaft drive 170 includes a drive arm 1710 pivotally mounted to raised frame beam 1130. A hydraulic actuator 1720 raises and lowers drive arm 1710 into contact with axle shaft 10. A drive roller 1730 is mounted to the distal end of drive arm 1710. An electric motor 1740 carried on drive arm 1710 turns drive roller 1730 to rotate shaft 10 and hub 20 during the weld process.

In operation, slide carriage 130 is first positioned to accommodate the particular length of axle shaft 10 and hub lifts 160 are fitted with the appropriate hub adaptor 1650 to accommodate the particular hub assembly 20. Typically, conveyers and load apparatus (not shown) deliver and position axle shafts 10 to automatically or manually feed into welder 100. Axle shafts 10 roll into position along feed rails 1140 onto shaft supports 140. Shaft supports 140 carry axle shafts 10 atop rollers 1440. Similarly, conveyers and load apparatus (not shown) deliver and position hub assemblies 20 to be automatically or manually fed into welder 100.

With hub lifts 160 in the "load" position, hub platens 1620 are pivoted downward so that hub assemblies 20 can be fitted to hub adapters 1650. Hub assemblies 20 are secured to hub adaptors 1650 by lug nuts (not shown) that turn on the hub's lug bolts that extend through lug holes 1551 in the hub adaptor. Initially, locking solenoid is activated to "lock" hub adaptors 1650 in position and prevent the adaptor from rotating about hub platen 1620. When activated, the solenoid pin extends into lock hole 1653 properly positioning each hub assembly 20 relative to axle shaft 10 and each other.

Once hub assemblies 20 are loaded and secured to hub adaptors 1650 within hub lifts 160, hub platens 120 are pivoted upward into the "weld" position (FIGS. 8 and 11). With hub lifts 160 in the "weld" position and hub adaptors 1650 "locked", electrode arms 150 lower into position to form a "spot" weld initially joining hub assemblies 20 and axle shaft 10. Once the initial spot weld is made, locking solenoid 1640 is deactivated withdrawing the solenoid pin from lock hole 1653 and allowing hub adaptor 1650 to rotate freely about the platen bearing shaft. Shaft drive 170 is lowered to engage axle shaft 10. Drive motor 1740 turns rollers 1730 to rotate hub assemblies 20 and axle shaft 10 in unison, as electrode arms 150 form a continuous weld bead permanently joining the hub assemblies and axle shaft. Once hub assemblies 20 have been joined to axle shaft 10, hub assemblies 20 are unbolted from hub adaptors 1650. The completed axle assembly can now be conveyed away from welder 100 and hub lifts moved back into the "load" position to join the next axle assembly.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. An axle welder for joining a pair of hub assemblies to an axle shaft, the welder comprising:
    a support frame having a first frame end and a second frame end;
    a carriage carried by the frame for sliding movement between the first frame end and the second frame end;
    a first axle shaft support mounted to the support frame, and a second axle shaft support mounted to the carriage, each of the first axle shaft support and the second axle shaft support for holding the axle shaft within the support frame;
    a first hub lift mounted to the support frame and a second hub lift mounted to the carriage, each of the first hub lift and the second hub lift for receiving one of the pair of hub assemblies and for lifting and positioning the pair of hub assemblies relative to the axle shaft held within the support frame, each of the first hub lift and the second hub lift moves pivotally between a load position spacing the hub assemblies axially below and away from the axle shaft held within the support frame and a weld position raising and positioning the pair of hub assemblies to axially abut the axle shaft held within the support frame at opposing ends thereof; and
    a shaft drive mounted to the support frame for rotating the axle shaft atop during the weld process movement between an engaged position rotating the axle shaft and a disengaged position pivoted away from the axle shaft; and
    a pair of weld units mounted to the support frame for joining the pair of hub assembles to the axle shaft.

2. The axle welder of claim 1 wherein the carriage rides on rails mounted to the support frame at the second frame end.

3. The axle welder of claim 2 wherein the carriage includes an actuator from moving the carriage along the rails between the first frame end and the second frame end.

4. The axle welder of claim 1 wherein each of the first axle shaft support and the second axle shaft support includes an extensible mast selectively raised and lowered from an upright post, and a pair of rollers mounted to the mast for carrying the axle shaft thereon.

5. The axle welder of claim 1 wherein each of the first hub lift and the second hub lift includes a hub platen pivotally connected to a frame member and a lift actuator for moving the platen between the load position and the weld position.

6. The axle welder of claim 5 wherein each of the first hub lift and the second hub lift also includes a hub adaptor for receiving one of the pair of hub assemblies, the hub adaptor is rotatably fitted to the hub platen.

7. The axle welder of claim 6 wherein hub adaptors have a plurality of lug holes for receiving one or more lug bolts of the hub assembly.

8. The axle welder of claim 6 wherein hub adaptors include one or more detachable counterweights mounted thereto.

9. The axle welder of claim 6 wherein hub adaptors include a locator arm pivotally mounted thereto.

10. The axle welder of claim 6 wherein each of the first hub lift and the second hub lift further includes a lock mechanism selectively activated to prevent the hub adaptor from rotating relative to the hub platen.

11. The axle welder of claim 1 wherein the shaft drive includes a drive arm pivotally mounted to the support frame, a drive actuator for moving the drive arm between the engaged position and the disengaged position, a drive roller mounted to the drive arm and a drive motor mounted to the drive arm for turning the drive roller.

12. The axle welder of claim 1 wherein each of the pair of weld units includes an articulated weld arm movable relative to one of the first hub lift and the second hub lift and an electrode head fitted to the weld arm.

13. An axle welder for joining a pair of hub assemblies to an axle shaft, the welder comprising:
    a support frame having a first frame end and a second frame end;
    a carriage carried by the frame for sliding movement between the first frame end and the second frame end;
    a first axle shaft support mounted to the support frame, and a second axle shaft support mounted to the carriage, each of the first axle shaft support and the second axle shaft support for holding the axle shaft within the support frame;
    a first hub lift mounted to the support frame and a second hub lift mounted to the carriage, each of the first hub lift and the second hub lift for receiving one of the pair of hub assemblies and pivotal movement between a load position spacing the hub assemblies away from the axle shaft held within the support frame and a weld position locating the pair of hub assemblies adjacent the axle shaft held within the support frame; and
    a shaft drive mounted to the support frame for rotating the axle shaft atop during the weld process movement between an engaged position rotating the axle shaft and a disengaged position pivoted away from the axle shaft; and
    a pair of weld units mounted to the support frame for joining the pair of hub assembles to the axle shaft,
    each of the first hub lift and the second hub lift includes a hub platen pivotally connected to a frame member and a lift actuator for moving the platen between the load position and the weld position, each of the first hub lift and the second hub lift also includes a hub adaptor for receiving one of the pair of hub assemblies, the hub adaptor is rotatably fitted to the hub platen.

14. The axle welder of claim 13 wherein the carriage rides on rails mounted to the support frame at the second frame end.

15. The axle welder of claim 14 wherein the carriage includes an actuator for moving the carriage along the rails between the first frame end and the second frame end.

16. The axle welder of claim 13 wherein each of the first axle shaft support and the second axle shaft support includes an extensible mast selectively raised and lowered from an upright post, and a pair of rollers mounted to the mast for carrying the axle shaft thereon.

17. The axle welder of claim 13 wherein hub adaptors have a plurality of lug holes for receiving one or more lug bolts of the hub assembly.

18. The axle welder of claim 13 wherein hub adaptors include one or more detachable counterweights mounted thereto.

19. The axle welder of claim 13 wherein hub adaptors include a locator arm pivotally mounted thereto.

20. The axle welder of claim 13 wherein each of the first hub lift and the second hub lift further includes a lock mechanism selectively activated to prevent the hub adaptor from rotating relative to the hub platen.

21. The axle welder of claim 13 wherein the shaft drive includes a drive arm pivotally mounted to the support frame, a drive actuator for moving the drive arm between the engaged position and the disengaged position, a drive roller mounted to the drive arm and a drive motor mounted to the drive arm for turning the drive roller.

22. The axle welder of claim 13 wherein each of the pair of weld units includes an articulated weld arm movable relative to one of the first hub lift and the second hub lift and an electrode head fitted to the weld arm.

* * * * *